United States Patent
Esheim (10) Patent No.: US 12,539,401 B2
(45) Date of Patent: Feb. 3, 2026

(54) IMPLANTABLE LEAD REVISION AND REPLACEMENT SYSTEM

(71) Applicant: Taiki Esheim, Chicago, IL (US)

(72) Inventor: Taiki Esheim, Chicago, IL (US)

( * ) Notice: Subject to any disclaimer, the term of this patent is extended or adjusted under 35 U.S.C. 154(b) by 1008 days.

(21) Appl. No.: 17/653,369

(22) Filed: Mar. 3, 2022

(65) Prior Publication Data

US 2023/0277817 A1    Sep. 7, 2023

(51) Int. Cl.
*A61M 25/09* (2006.01)
*A61M 25/00* (2006.01)

(52) U.S. Cl.
CPC .. *A61M 25/09041* (2013.01); *A61M 25/0029* (2013.01); *A61M 2205/02* (2013.01)

(58) Field of Classification Search
CPC ........ A61M 25/09041; A61M 25/0029; A61M 2205/02
See application file for complete search history.

(56) References Cited

U.S. PATENT DOCUMENTS

| | | | |
|---|---|---|---|
| 4,552,554 A | 11/1985 | Gould et al. | |
| 6,682,536 B2 | 1/2004 | Vardi et al. | |
| 8,235,916 B2 | 8/2012 | Whiting et al. | |
| 8,398,698 B2 | 3/2013 | Eidenschink | |
| 8,747,456 B2 | 6/2014 | Baim et al. | |
| 9,737,360 B2 | 8/2017 | West et al. | |
| 2013/0184741 A1* | 7/2013 | Laroya | A61B 17/221 606/200 |
| 2014/0180256 A1* | 6/2014 | Millett | A61B 5/6851 604/528 |
| 2014/0275983 A1* | 9/2014 | Piccagli | A61M 25/0108 600/585 |

OTHER PUBLICATIONS

Cleveland Clinic "Lead Extraction", pp. 1-18, May 17, 2019, https://www.my.clevelandclinic.org/health/treatments/17165-lead-extraction.
Johns Hopkins Medicine "Lead Extraction", pp. 1-5, Aug. 22, 2015, https://www.hopkinsmedicine.org/health/treatment-tests-and-therapies/lead-extraction.
MedTronic, "Amplatz Goose Neck Snare and Microsnares", pp. 1-6, Nov. 2017, https://www.medtronic.com/us-en/healthcare-professionals/products/cardiovascular/snares/amplatz.html.

(Continued)

*Primary Examiner* — Eric F Winakur
(74) *Attorney, Agent, or Firm* — McDonald Hopkins LLC (57) ABSTRACT

Devices for revising and replacing an implanted device are disclosed, which include a first lumen having a neck portion, a first aperture that opens to the neck portion of the first lumen, and a flap having a top edge, a bottom edge, a second aperture, and first and second lateral edges extending between the top and bottom edges. The neck portion of the first lumen is configured to receive a new guidewire inserted through the first aperture. The lateral edges of the flap are folded around an implanted device to form a second lumen in the bottom portion of the device, and a new guidewire inserted into the first lumen through the first aperture. The devices allow for the successive and nearly simultaneous revision and replacement of an implanted device.

14 Claims, 6 Drawing Sheets

(56) References Cited

OTHER PUBLICATIONS

Venkatesan, "Essential cath lab hardware : Snares and retrieval of foreign bodies", Expression in cardiology, pp. 1-7, Mar. 4, 2015, https://www.drsvenkatesan.com/tag/ev3-covdien-medtronic/.

"Cardiac Interventions Today—US Device Guide—Snares", pp. 1-2, Mar. 3, 2022, https://www.citoday.com/device-guide/us/snares-3.

MeritMedical, "ENSnare Endovascular Snare System", pp. 1-8, Published: May 24, 2014, Last Modified: Feb. 23, 2022, https://www.merit.com/peripheral-intervention/intervention/snares-accessories/en-snare-endovascular-snare-system.

\* cited by examiner

IMPLANTABLE LEAD REVISION AND REPLACEMENT SYSTEM

BACKGROUND

The present disclosure relates to devices and methods for revising and replacing an implanted device.

Surgically implanted stimulators, such as pacemakers and implantable cardiac defibrillators (ICDs), help treat irregular heart rhythms. Generally, implanted stimulators contain two main components: a pulse generator and implanted lead devices (hereinafter also referred to as "implanted devices"). The pulse generator contains electric circuits and a battery. The leads are wires that connect the pulse generator to the heart (or other stimulated tissue). More particularly, the leads contact the heart and supply a current from the pulse generator that compels the heart to beat more rapidly (in the case of a pacemaker) or to beat more slowly (in the case of an ICD). Typically, leads are inserted into a patient's vein and are passed through the vein and into the right side of the heart, where they are attached to the muscular wall of the heart.

In general, the leads are intended to remain permanently secured to the heart wall. However, in some instances it may be necessary or desirable to revise or replace the leads. For example, revision procedures may be used when the leads need to be repositioned (e.g., if they become dislodged). In addition, the leads may be extracted and replaced if the ICD or the pacemaker becomes defective, if a heart valve becomes infected, if a clot forms on a lead and obstructs a vein, if one of the leads malfunctions or breaks, or if a lead is to be upgraded. According to conventional lead extraction procedures, if the implanted lead is attached to the heart wall, a laser light or drill-like tip of the device can be used to break up scar tissue and free the implanted lead. The implanted lead is then retracted out of the vein.

Existing lead revision and replacement (or addition) procedures, such as the SELDINGER technique, which introduces a new wire via a needle puncture into the vein, are often invasive and complex. For example, if complications (e.g., ruptures in the vein) arise during lead revision or replacement, the patient may need emergency open heart surgery. Other adverse events may include pneumothorax, hemothorax, and damage to the existing lead insulation. Moreover, it is extremely difficult for surgeons to revise or replace an implanted lead or add a new guidewire following the initial lead insertion. It is not currently possible to introduce a new guidewire or a replacement or additional lead wire into an existing puncture in the patient's vein or along an existing lead wire because the puncture is small and the lead wire is often obstructed within the patient's body cavity. Thus, guidewires or replacement or additional lead wires are generally introduced in a subsequent procedure, which may involve making a second puncture in the patient's vein and guiding the guidewire or the replacement lead wire into the vein with additional devices.

Subsequent procedures may substantially lengthen the duration of surgery (or require additional surgeries/procedures), thereby expending limited precious resources that could be devoted to other patients or procedures (e.g., staff, surgical room). Moreover, subsequent lead revision or replacement procedures unnecessarily expose the patient to additional risks, including, for example, infections, anesthesia complications, and possible cardiac events in the intervening period between lead extraction and replacement.

SUMMARY

In light of the above, there is a need to provide a device and a corresponding method that is capable of performing successive and nearly simultaneous revision and/or replacement procedures, such that a new guidewire uses the implanted device as a guide to enter an existing incision in a vein or other tissue and to access an implant site. The device can shorten the duration of lead revision and replacement surgical procedures, can allow surgeons to more reliably revise the implanted device or to insert a replacement or additional lead wire into an existing incision in the vein, can minimize exposure of the patient to any additional risks of infection or other complications, and can minimize the expense of additional hospital resources. It also is desirable to provide a device that can be quickly and easily applied in a surgical setting and that is easily removed when no longer necessary. Further, it is desirable to have a device that is capable of being placed over implanted devices of varying sizes, or which may be quickly and easily configured to fold around leads of varying sizes, as well.

In one aspect, disclosed is a lead wire device that includes a first aperture at a neck portion of the device that is configured to receive a guidewire. The device also contains a flap at a lower portion thereof that has a top edge, a bottom edge, first and second lateral edges, and a second aperture that opens from an exterior surface of the flap. The device also contains a first lumen extending between the first aperture and the second aperture, and extending at least partially within the flap. The first and second lateral edges of the flap are configured to fold about a longitudinal axis of the flap, thereby forming a second lumen. An interior surface of the second lumen is opposite the exterior surface of the flap.

In one specific example, the second lumen extends between a third aperture and a fourth aperture, the third aperture opening between the neck portion and the lower portion and being defined by the top edge of the flap, and the fourth aperture being defined by the lower edge.

In another example, the first and second lateral edges are folded inward about a lead wire implanted in a patient, such that a proximal edge of the implanted lead wire extends out of the third aperture and a distal end of the implanted lead wire extends out of the fourth aperture, and such that a portion of the implanted lead wire is encapsulated in the second lumen between the third and fourth apertures.

In another example, an outer diameter of the second lumen is tapered toward the fourth aperture, such that the device is configured to puncture tissue of a patient at the fourth aperture.

In another example, the flap is tapered at or toward the bottom edge.

In another example, the bottom edge of the flap contains a hydrophilic medical-grade material.

In another example, the interior surface of the flap contains medical-grade silicones, vinyls, gels, rubbers, plastics or a combination thereof.

In another example, an inner diameter of the second lumen is between 4 Fr and 20 Fr.

In another example, an inner diameter of the first lumen is between 0.018 inches and 0.038 inches.

In another aspect, disclosed is a method of implanting guidewires into a tissue of a patient by folding the first and second lateral edges of the flap of the device around an implanted lead wire in the tissue of the patient to form a second lumen, a third aperture, and a fourth aperture, such that a proximal end of the implanted lead wire extends out of the third aperture, a distal end of the implanted lead wire extends out of the fourth aperture, and a portion of the implanted lead wire is encapsulated in the second lumen between the third and fourth apertures. The third aperture is open between the neck portion and the lower portion of the device and defined by the top edge of the flap. The fourth aperture is defined by the bottom edge of the flap. The method also includes advancing the device along the implanted lead wire and into the tissue of the patient, inserting the guidewire through the first aperture, and advancing the guidewire through the first lumen and out of the second aperture, such that the guidewire enters the tissue of the patient.

DETAILED DESCRIPTION

Considering the above, it is desirable to provide a device and corresponding method capable of performing successive and nearly simultaneous revision and/or replacement (or addition) procedures of implanted devices (e.g., lead wires), such that a new guidewire uses the implanted device as a guide to enter an existing incision in a vein or other tissue and to access an implant site. Such a device can shorten the duration of lead revision and replacement surgical procedures, can allow surgeons to more reliably revise the implanted device or to insert a replacement or additional lead wire (hereinafter, a "new implanted device") into an existing incision in the vein, can minimize exposure of the patient to any additional risks of infection or other complications, and can minimize the expense of additional hospital resources. It also is desirable to provide a device that can be quickly and easily applied in a surgical setting and that is easily removed when no longer necessary. Further, it is desirable to have a device that is capable of being placed over implanted devices of varying sizes, or which may be quickly and easily configured to fold around leads of varying sizes, as well.

Figure 1:
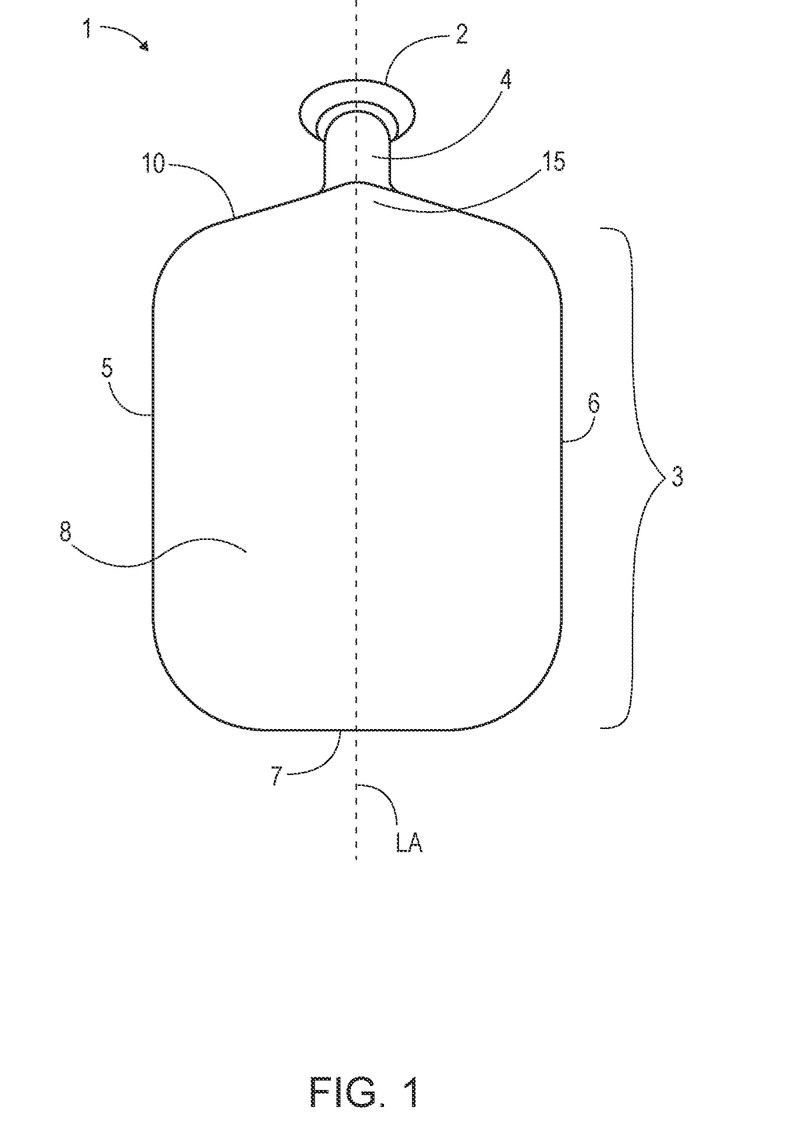
FIG. 1 illustrates an unfolded view of a first example of a lead wire revision and replacement device of the present disclosure.
Figure 2:
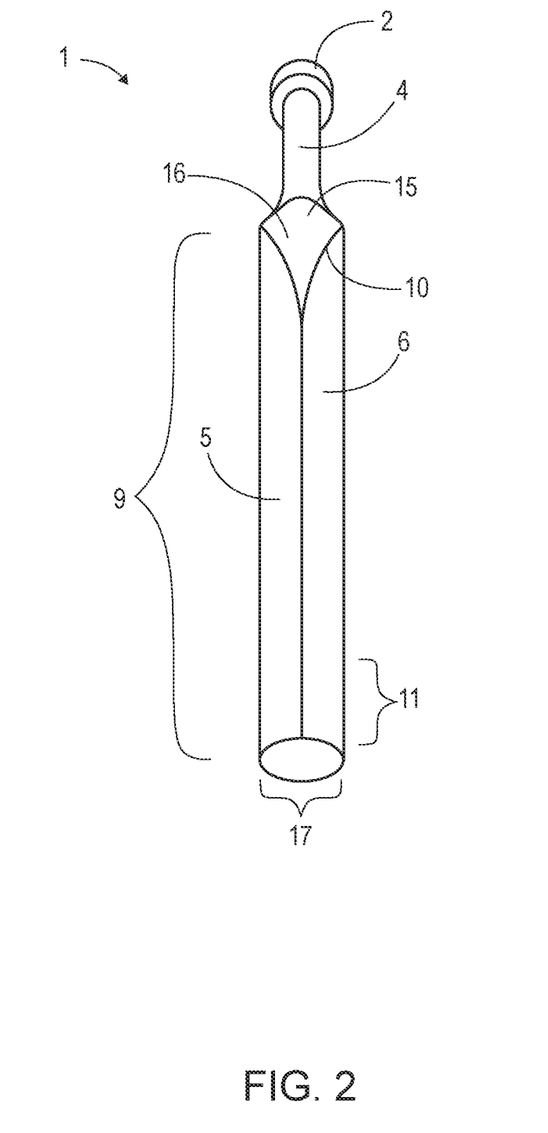
FIG. 2 illustrates a folded view of the first example of a lead wire revision and replacement device in its folded form.
Figure 3:
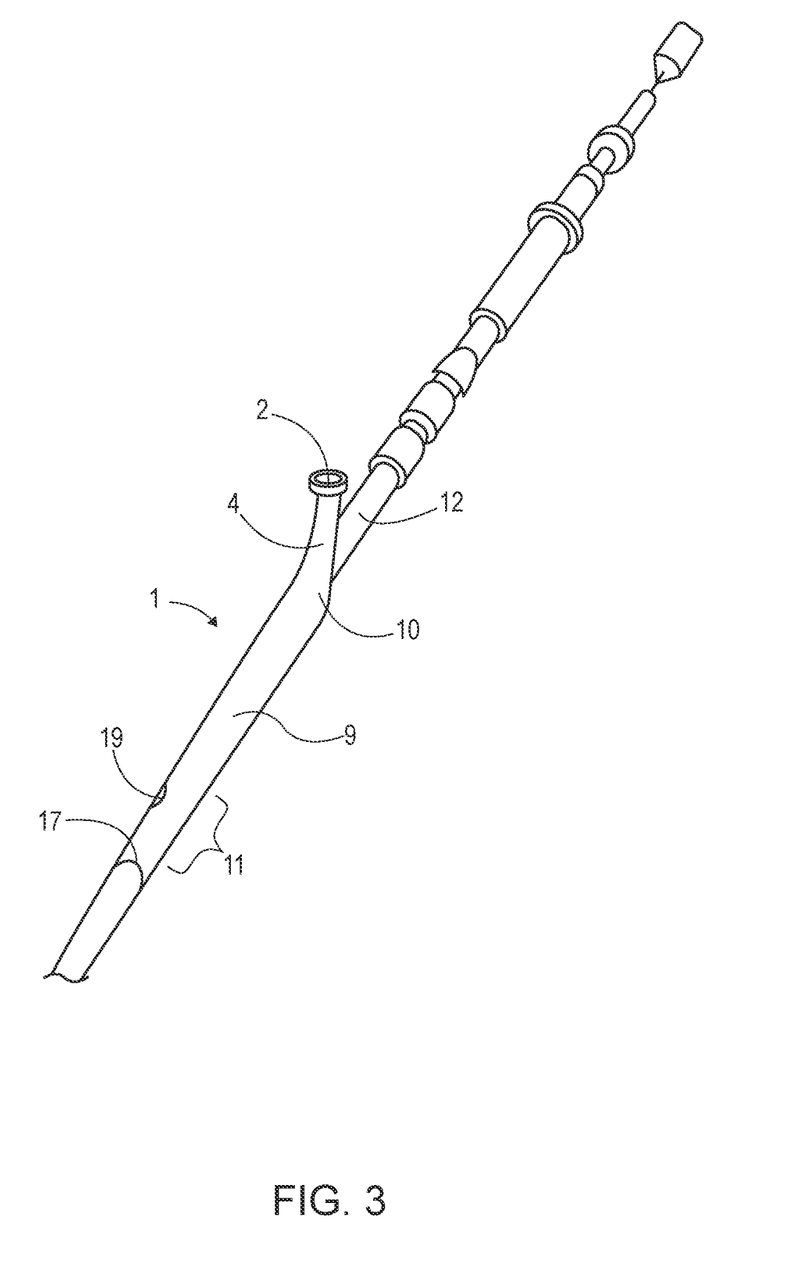
FIG. 3 illustrates the first example lead wire revision and replacement device positioned about the circumference of an existing implanted device.
Figure 4:
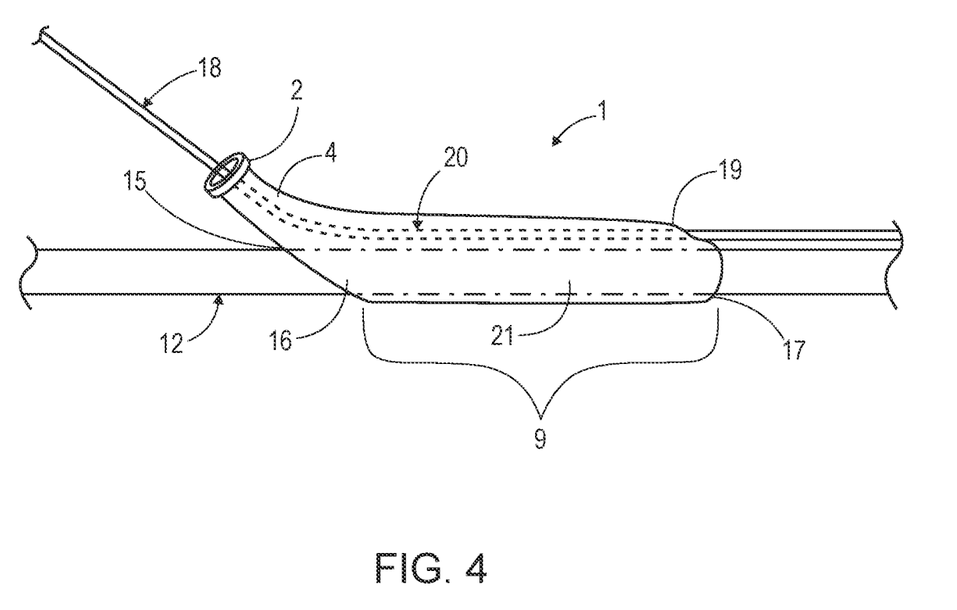
FIG. 4 illustrates a longitudinal cross-sectional view of the first example lead wire revision and replacement device after a new guidewire has passed through the first aperture, into the first lumen, and out of the second aperture.

In the examples shown in FIGS. 1-4, the lead wire retrieval and insertion device 1 is shown unfolded (FIG. 1) and folded (FIGS. 2-4). With reference to FIG. 2, the lead wire revision and/or replacement device 1 includes a first aperture 2 configured to receive a new guidewire in a conventional manner (e.g., by inserting the new guidewire through the first aperture 2 and from which a proximal end of the new guidewire extends), a second aperture (identified by reference numeral 19 in FIG. 4, on an exterior surface of a flap 3) from which the distal end of the new guidewire extends, a third aperture 16 through which a proximal end of an implanted device extends, and a fourth aperture 17 from which the distal end of the implanted device extends. As illustrated in FIG. 4, the folded lead wire device 1 thus has a first lumen 20 extending from the first aperture 2 to the second aperture 19, and a second lumen 21 extending from the third aperture 16 to the fourth aperture 17. A neck portion 4 of the device 1 extends between the first 2 aperture and a bottom opening of the neck portion 15, and a lower portion 9 of the device 1 extends between the third 16 and fourth 17 apertures. In other words, when the device 1 is folded, the second lumen 21 is defined entirely within the lower portion 9 of the device between the third 16 and fourth 17 apertures; and the first lumen 20 is defined between the first aperture 2 and the second aperture 19, such that the first lumen 20 extends through the neck portion 4 and the lower portion 9 of the device 1. As illustrated in FIG. 4, the first lumen 20 and the second lumen 21 are separated within the lower portion of the device 9.

With reference to FIG. 4, the first lumen 20 is at least partially integrally formed in the device 1 between the first 2 and second 19 apertures, such that it extends through the neck 4 and a flap 3. Thus, the first lumen 20 is present when the device 1 is in both unfolded and folded states. In contrast, with reference to FIGS. 1, 2 and 3, the second lumen 21 is present when the flap 3 is folded about a longitudinal axis LA (indicated by dashed line LA in FIG. 1) or about the circumference of an existing implanted device 12 in a patient (i.e., the "folded state").

In the example of FIG. 1, the flap 3 includes first 5 and second 6 lateral edges, a top edge 10 that at least partially attaches to a bottom opening 15 of the neck portion 4, and a bottom edge 7 opposite to the top edge 10. In other words, when the first 5 and second 6 lateral edges of the flap 3 are folded towards each other about a longitudinal axis LA of the flap 3, the flap 3 forms the second lumen 21, the third aperture 16, and the fourth aperture 17. When the first 5 and second 6 lateral edges are folded, the third aperture 16 is defined by a bottom opening 15 of the neck portion 4 and the top edge 10 of the flap 3, and the fourth aperture 17 is defined by the bottom edge 7 of the flap 3. An interior surface of the second lumen 21 is defined by an interior surface 8 of the flap 3. As suggested above and with reference to FIG. 3, the first 5 and second 6 lateral edges of the flap 3 are configured to fold around a longitudinal axis (LA) of the flap 3 or, alternatively, the circumference of an existing implanted device 12 implanted in a patient such that at least a portion of the implanted device 12 is encapsulated within the second lumen 21 contained within the lower portion 9 of the device 1, and the proximal portion of the implanted device 12 extends from the third aperture 16.

In some embodiments, the first 5 and second 6 edges are folded such that either the first edge 5 overlaps the second edge 6 or the second edge 6 overlaps the first edge 5. The overlapped edges can be secured to each other via conventional means, such as by medical grade adhesives or silicones. It is also envisioned that the first 5 and second 6 edges can be folded such that the edges 5, 6 meet and are abutted to each other, but do not overlap. When the edges 5, 6 are folded, the third aperture 16 can be closer to the first aperture 2 than to the fourth aperture 17, so that the device 1 may be inserted further.

In some embodiments, the width of the flap 3 gradually narrows (i.e. tapers) toward the portion where the top edge 10 of the flap 3 connects with the bottom opening 15 of the neck portion 4. In this manner, a distal portion of the third aperture 16 forms a gradual opening, such as that seen in FIG. 2. Similarly, the width of the flap 3 gradually narrows to the bottom edge 7. In this manner, the fourth aperture 17 may be sharp or pointed. In some embodiments, the width of any portion or all of the flap 3 remains constant from the portion where the top edge 10 of the flap 3 connects with the bottom opening 15 of the neck portion to the bottom edge 7.

A surface 8 of the flap 3 is an interior surface of the second lumen 21. As such, the interior surface 8 may be made of or coated with a material that is safe for use in medical procedures including, but not limited to, medical grade vinyls, gels, silicones, rubbers, plastics or combinations thereof. In one embodiment, an interior surface 8 of the lumen 21 (or flap 3 when unfolded) may be coated with silicone or other material that is tacky when in contact with an implanted device 12. Accordingly, the revision and/or replacement device 1 may be self-securing to the implanted device 12 and may securely embrace the implanted device 12 as the device 1 is advanced into the vein. Depending on the material of the surface 8 and any adhesives or the like securing the flap 3, the revision and/or replacement device 1 may be prevented from moving, or free to move, along the length of the implanted device 12. Similarly, the first lumen 20, which is integrated with and extends through the neck portion 4, may also be made of or coated with a hydrophilic material, an adhesive, or a tacky material such as those mentioned above.

In some embodiments, the bottom edge 7 of the flap 3 is made of or coated with a medical-grade hydrophilic material configured to reduce the force required to manipulate the device during procedures, to reduce the frictional force, or to decrease the risk of damage to blood vessels. An exterior surface of the device 1 may alternatively or additionally be coated with a hydrophilic material so that it does not catch or stick to vasculature, thus improving the ease of advancement of the device 1 during procedures. In some embodiments, the bottom edge 7 of the flap 3 is made of or coated with the same material as the interior surface 8 of the flap 3. In alternative embodiments, the bottom edge 7 of the flap 3 may be made of or coated with a different material than the interior surface 8 of the flap 3.

In some embodiments, the neck 4, the first 2 and second 19 apertures, the first lumen 20, and the flap 3 may be integrally formed. In other embodiments, the flap 3 may be affixed to the neck portion 4 at a seam, for example, by injection molding, plastic welding, or any other method known in the manufacturing of medical devices. In these embodiments, the first lumen 20 may be formed when the neck portion 3 and the flap 3 are affixed together. In the illustrated embodiment, the flap 3 is integrally formed with or affixed along an arcuate seam to an interior portion of the bottom opening 15 of the neck portion 3, and extends radially outward. The flap 3 can extend around at least 20%, at least 30%, at least 40%, at least 50%, at least 60%, at least 70%, at least 80%, at least 90% or at least 100% of the perimeter of the bottom opening 15 of the neck portion 4.

In some embodiments, the outer diameters of the first 20 and second 21 lumen remain substantially constant over their lengths. The diameter of the first lumen 20 should not intrude upon the second lumen 21. In other words, a new guidewire 18 housed within the first lumen 20 should not prevent the implanted device 12 from being housed in or passing through the second lumen 21. The diameter of the second 21 lumen may narrow over its length, particularly toward the fourth aperture 17, such that the diameter of the second lumen 21 is narrowest at the fourth aperture 17. In this manner, the fourth aperture 17 may be sharpened and/or pointed to puncture or perforate a vein or tissue such that at least a distal end 11 of the device 1 may be implanted into the vein or tissue. Such a narrowing of the second 21 lumen may be realized by a flap 3 that narrows at or towards the bottom edge 7, or otherwise forms a point at the bottom edge 7. In another embodiment, the fourth aperture 17 may have a smooth or dull end.

The inner diameters of the first 2 and second 19 apertures are preferably large enough to accommodate guidewires of different sizes. For example, the first 2 and second 19 apertures (and lumen 20) may have inner diameters between about 0.018 inches to about 0.038 inches. The inner diameters of the third 16 and fourth 17 apertures (and thus the dimension of flap 3 orthogonal to the longitudinal axis LA), and the lumen 21, should be large enough to accommodate implanted devices 12 of different gauges (Fr). For example, in some embodiments, the third 16, and fourth 17 apertures have diameters equivalent to about 4 Fr to about 20 Fr.

The following will describe how the device may be used to restore access to venous or arterial anatomy by riding or "piggy backing" onto an existing implanted device 12 in order to revise or replace the implanted device 12. In one embodiment, the process begins when the first 5 and second 6 lateral edges of the device 1 are folded about an implanted device 12, thereby forming the lower portion 9 of the device 1 and the second lumen 21 in the manner detailed above, such that a portion of the implanted device 12 extends through the second lumen 21 between the third aperture 16 and the fourth aperture 17. In a second embodiment, as noted above, the first 5 and second 6 lateral edges of the device 1 are folded about longitudinal axis LA, thereby forming the lower portion 9 of the device 1 and the second lumen 21 in the manner detailed above. In this embodiment, a portion of the implanted device 12 is pushed or forced between the first 5 and second 6 lateral edges of the folded device 1 and into the second lumen 21. Thus, the device 1 can also be folded about the implanted device 12 in this manner.

FIG. 3 illustrates a view of the device 1 folded about an implanted lead wire 12. The device 1, now having the second lumen 21 occupied by a portion of the implanted device 12, is slid along the length of the implanted device 12 until the fourth aperture 17 enters the body of the patient through a pre-existing incision point in the skin (through which the implanted lead wire enters the body) and passes into an incision in the vein or tissue in which the implanted device 12 is located. The fourth aperture 17 may also simply abut the incision in the vein or tissue through which the implanted device 12 passes, rather than entering into it. In some embodiments, insertion of the device 1 may expand or extend the existing incision in the vein with the sharpened end of the fourth aperture 17.

Referring now to FIG. 4, once the fourth aperture 17 has passed through the pre-existing incision in the skin and, optionally, through the pre-existing incision in the vein, a new guidewire 18 is inserted into the first aperture 2 of the device 1 and is advanced through the first aperture 2 into the first lumen 20, passing through those parts of the first lumen 20 located in both the neck 4 and the lower portion 9. As the new guidewire 18 is advanced into the region of the first lumen 20 located in the lower portion 9 of the device, the new guidewire 18 tracks (i.e., piggy backs) along the length of the implanted device 12 in the second lumen 21. The new guidewire 18 then exits the device 1 at the second aperture 19 and passes into the vein (or other tissue), where it is advanced until it reaches the patient's heart (or other implant site).

In other embodiments, the new guidewire 18 may first be inserted into the first aperture 2, and optionally through the first lumen 20 to the lower portion 9 of the device, prior to the fourth aperture 17 entering the skin and/or vein or tissue in which the implanted device 12 is located. In this case, the new guidewire 18 can be advanced along the implanted device 12 prior to or at the same time the device 1 is inserted into the incision(s) in the skin and, optionally, the vein.

When the new guidewire 18 has reached the patient's heart (or other implant site), the device 1 is detached from the implanted device 12 and the new guidewire 18. In some cases, the operating clinician may need to reverse the implanted device 12 in order to provide access to the device 1 for detachment. The device 1 may be detached by cutting, pulling or tearing the device 1 off of the leads, or by any other suitable detaching methods known in the art. For example, the device 1 may be unfolded by detaching first 5 and second 6 lateral edges of the flap 3 from each other. After the device 1 is detached, the implanted lead wire 12 may be manipulated or repositioned. Alternatively, the implanted device 12 may removed from the patient's body by carefully retracting the implanted device 12 directly or through another device, in which case a sheath may be positioned and advanced over the new guidewire 18 so that a new (replacement) lead wire may be inserted into the patient's body in the manner conventionally known in the art. This method may be repeated as often as necessary or desired including when, for example, a implanted device 12 becomes dislodged, detached or broken during an initial implantation procedure. The existing implanted device 12 may be left in the vein, or removed.

In circumstances where the implanted device 12 is not easily removed because it is broken or because of irregular or angular positioning, it may be desirable to use the device in combination with other tools, such as a lead snaring mechanism. In some embodiments, the device 1b and the lead snaring mechanism 13 are integrally formed. In other embodiments, the device 1b and the lead snaring mechanism 13 are provided as separate devices, such that the device 1b may be positioned along the external surface of the lead snaring mechanism 13 and optionally affixed thereto. In the embodiments illustrated in FIGS. 5 and 6, the device 1b and the lead snaring mechanism 13 are provided as separate devices. The lead snaring mechanism 13 contains a hollow lumen through which a looped wire 14 may be advanced. The looped wire 14 exits the lumen of the lead snaring mechanism 13 and is positioned over or around the implanted device 12. Once positioned around the implanted device 12 in this manner, a flap 53 of the lead snaring mechanism 13 is closed, thus forming a lumen in which the implanted device 12 is enclosed. The flap 53 may be made of a malleable material that is capable of wrapping around and grasping the implanted device 12. The exterior surface of the flap 53 may also be made of or coated with a hydrophilic material, such as those mentioned above, to reduce the frictional force and decrease the risk of damage to blood vessels and so that it does not catch or stick to vasculature.

Figure 5:
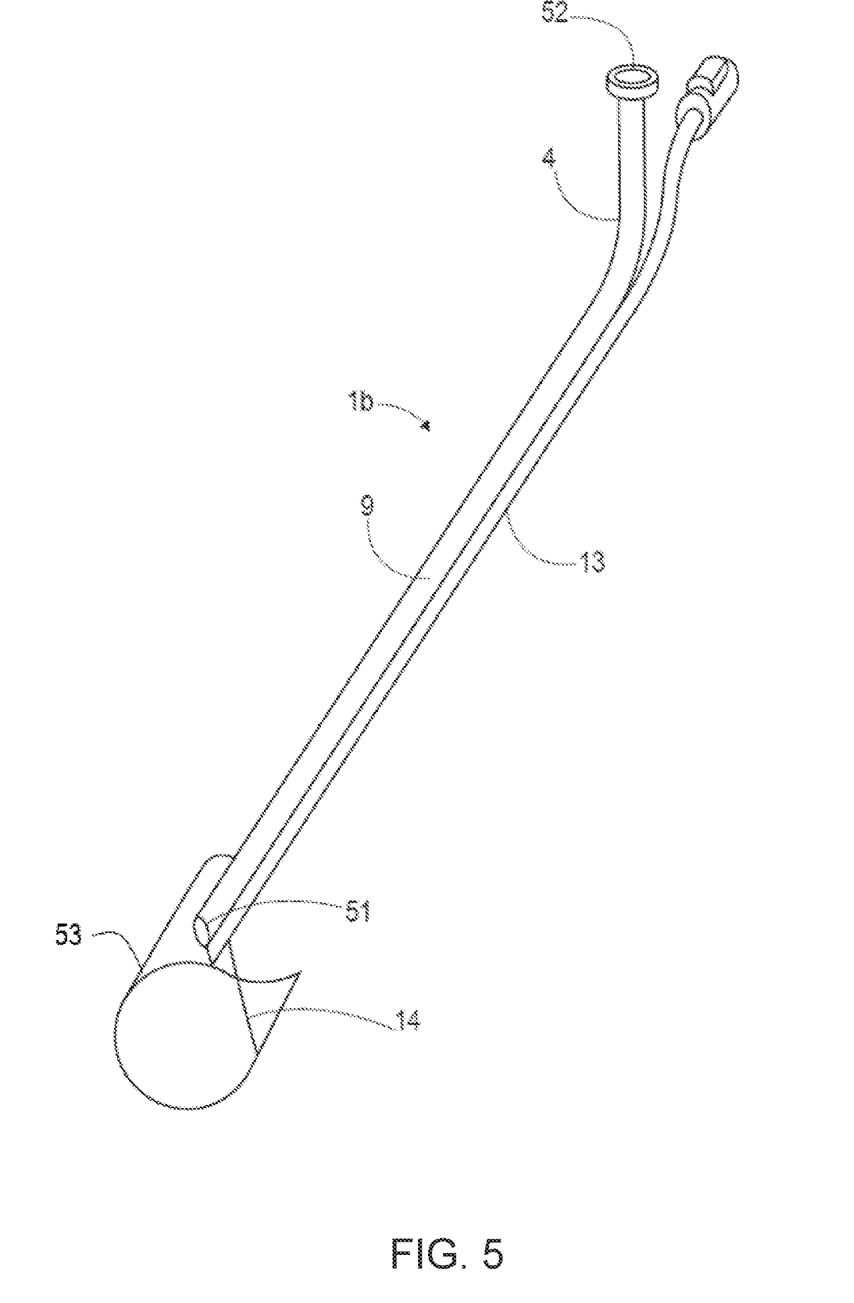
FIG. 5 illustrates a second example of a lead wire revision and replacement device, where the lead wire revision and replacement device has been positioned about and advanced along the external surface of a lead-snaring mechanism.
Figure 6:
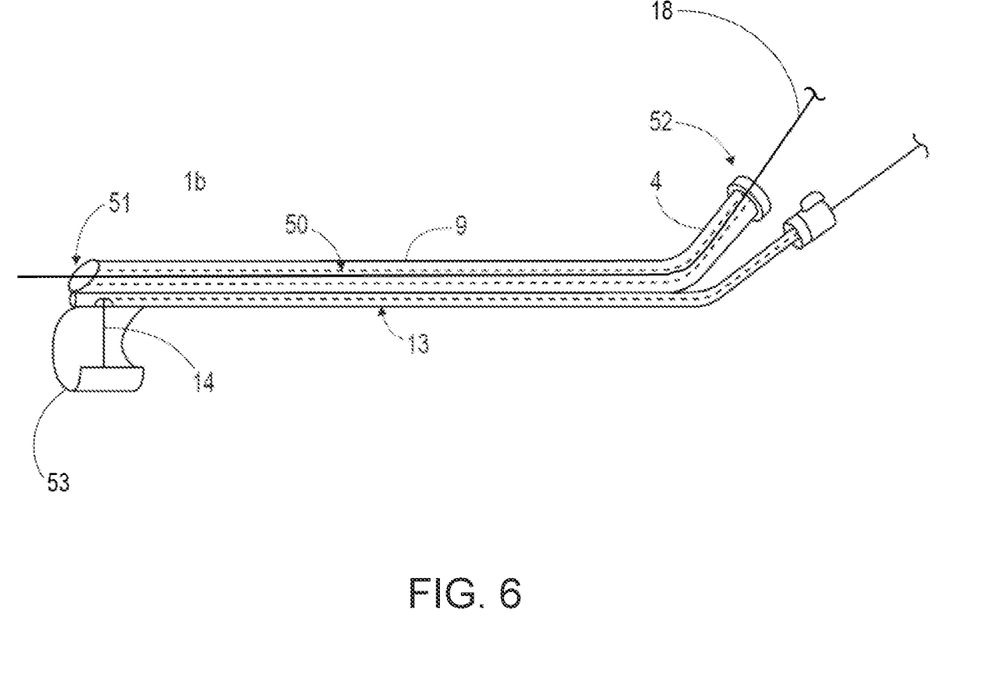
FIG. 6 illustrates a longitudinal cross-sectional view of the second example lead wire revision and replacement device positioned about and advanced along the external surface of a lead-snaring mechanism after a new guidewire has passed through the distal aperture, into the lumen, and out of the proximal aperture of the device.

As further illustrated in FIGS. 5 and 6, a lumen 50 is contained within a neck portion 4 and a lower portion 9 of the device 1b. The lower portion 9 of the device 1b is advanced along the external surface of the lead snaring mechanism 13 until the distal aperture 51 is adjacent to the patient's skin. The distal aperture 51 is inserted through a pre-existing incision in the patient's skin by pushing the device 1b. The distal aperture 51 is then passed through a pre-existing incision in the patient's vein. At this stage, as illustrated in FIG. 6, the new guidewire 18 is inserted into the proximal aperture 52 of the device 1b and is advanced through the proximal aperture 52 into the lumen 50, passing through those parts of the lumen 50 located in both the neck 4 and the lower portion 9. As the new guidewire 18 is advanced into the region of the lumen 50 located in the lower portion 9 of the device, the new guidewire 18 tracks (i.e., piggy backs) along the length of the lead snaring mechanism 13. The new guidewire 18 then exits the device 1b at the distal aperture 51 and passes into the vein (or other tissue), where it is advanced until it reaches the patient's heart (or other implant site).

For example, in one procedure, looped wire 14 exiting the lumen of the lead snaring mechanism 13 is positioned over or around the implanted device 12, and the flap 53 of the lead snaring mechanism 13 is closed to form a lumen. The implanted device 12 is enclosed within the lumen formed by the flap 53. The lower portion 9 of the device 1b remains adjacent to the external surface of the lead snaring mechanism 13 and adjacent to or inside of the pre-existing incision in the patient's vein. The new guidewire 18 is fed through the proximal aperture 52 of the device 1b and advanced into the lumen 50, passing through those parts of the lumen 50 located in both the neck 4 and the lower portion 9. The new guidewire 18 exits the device 1 at the distal aperture 51 and passes into the vein, where it is advanced until it reaches the patient's heart (or other implant site). The device 1b is then removed and/or detached as described above.

In another exemplary procedure, the new guidewire 18 is fed through the proximal aperture 52 of the device 1b and advanced into the lumen 50, passing through those parts of the lumen 50 located in both the neck 4 and the lower portion 9. The new guidewire 18 exits the device 1b at the distal aperture 51 and passes into the patient's vein, where it is advanced until it reaches the patient's heart (or other implant site). The device 1b is then removed or detached as described above. Once the device 1b is removed or detached, the implanted device 12 is ensnared or encircled by flap 53 as described above.

In use, the lead-retrieval devices described herein effectively allow for the successive and nearly simultaneous addition of a new guidewire 18 and the revision and/or replacement of an implanted device 12 by using the implanted device 12 (or a supplementary device applied over an implanted device 12) as a guide. The use of the device 1 described herein avoids unnecessarily making additional incisions in a patient's vein (thereby decreasing the risk of infection, hemorrhage, or another cardiac event), extending the duration of surgery, or postponing the lead replacement procedure to a later date.

Although the disclosure has been made with respect to select embodiments, it shall be understood that the scope of the disclosure is not thereby limited, and that it embraces all modifications and alterations thereof coming within the spirit and scope of the appended claims. Further, although the disclosure has been made with particular reference to implanted cardiac devices and lead wires in the vein and heart, it shall also be understood that the scope of the disclosure in not limited thereby. Rather, the disclosure is applicable to any procedures, devices, and tissues involving implanted devices.

What is claimed is:
1. A lead wire device comprising:
    a first aperture at a neck portion of the device, the first aperture being configured to receive a guidewire;
    a flap at a lower portion of the device, and having a top edge, a bottom edge, first and second lateral edges, and a second aperture that opens from an exterior surface of the flap; and a first lumen extending between the first aperture and the second aperture, and extending at least partially within the flap, wherein the first and second lateral edges of the flap are configured to fold about a longitudinal axis of the flap thereby forming a second lumen, an interior surface of the second lumen being opposite the exterior surface of the flap.

2. The device of claim 1, wherein the second lumen extends between a third aperture and a fourth aperture, the third aperture opening between the neck portion and the lower portion and being defined by the top edge of the flap, and the fourth aperture being defined by a lower edge of the flap that is opposite the top edge.

3. The device of claim 2, wherein the first and second lateral edges are adapted to be folded inward about a lead wire implanted in a patient, such that a proximal end of the implanted lead wire extends out of the third aperture and a distal end of the implanted lead wire extends out of the fourth aperture, and such that a portion of the implanted lead wire is encapsulated in the second lumen between the third and fourth apertures.

4. The device of claim 3, wherein a portion of the guidewire is encapsulated in the first lumen, such that a proximal end of the guidewire extends out of the first aperture and a distal end of the new guidewire extends out of the second aperture.

5. The device of claim 2, wherein an outer diameter of the second lumen is tapered toward the fourth aperture, such that the device is configured to puncture tissue of a patient at the fourth aperture.

6. The device of claim 1, wherein the flap is tapered at or toward the bottom edge.

7. The device of claim 1, wherein the bottom edge of the flap comprises a hydrophilic medical-grade material.

8. The device of claim 1, wherein the interior surface of the flap comprises medical-grade silicones, vinyls, gels, rubbers, plastics or combinations thereof.

9. The device of claim 1, wherein an inner diameter of the second lumen is between 4 Fr and 20 Fr.

10. The device of claim 1, wherein an inner diameter of the first lumen is between 0.018 inches and 0.038 inches.

11. The device of claim 1, wherein the flap has an unfolded position with the first and second lateral edges extending away from each other.

12. The device of claim 1, wherein the neck portion comprises an elongated body having an outer wall defining a portion of the first lumen, the first aperture being provided in the neck portion at an upper end of the first lumen, and the second aperture being provided at a lower end of the first lumen.

13. A method of implanting guidewires into a tissue of a patient, the method comprising:

folding the first and second lateral edges of the flap of the device of claim 1 around an implanted lead wire in the tissue of the patient, thereby forming a second lumen, a third aperture open between the neck portion and the lower portion of the device and defined by the top edge of the flap, and a fourth aperture defined by the bottom edge of the flap, such that a proximal end of the implanted lead wire extends out of the third aperture and a distal end of the implanted lead wire extends out of the fourth aperture, and such that a portion of the implanted lead wire is encapsulated in the second lumen between the third and fourth apertures;

advancing the device along the implanted lead wire and into the tissue of the patient;

inserting the guidewire through the first aperture; and advancing the guidewire through the first lumen, and out of the second aperture such that the guidewire enters the tissue of the patient.

14. The method of claim 13, further comprising, prior to the step of folding, providing the flap in an unfolded position with the first and second lateral edges extending away from each other.

* * * * *